United States Patent [19]

Chambless et al.

[11] 3,976,130
[45] Aug. 24, 1976

[54] PACKING MEANS FOR A WELLHEAD ASSEMBLY

[75] Inventors: Joe G. Chambless, Shreveport, La.; John W. Freeman, Houston, Tex.

[73] Assignee: ACF Industries, Incorporated, New York, N.Y.

[22] Filed: Aug. 1, 1975

[21] Appl. No.: 601,694

[52] U.S. Cl. ................................ 166/84; 166/89; 166/173; 285/187; 285/302
[51] Int. Cl.² ................ F16L 15/02; F16L 55/00; E21B 33/03
[58] Field of Search ............. 166/82, 84, 302, 304, 166/303, 86, 89, 170, 173; 285/302, 162, 187, 106

[56] References Cited
UNITED STATES PATENTS

| 1,598,794 | 9/1926 | Warren ................................ 166/89 |
| 2,323,179 | 6/1943 | Hall et al. ........................... 285/302 |
| 3,433,506 | 3/1969 | Crowe ................................ 285/302 |
| 3,504,936 | 4/1970 | Brown et al. ....................... 285/106 |

*Primary Examiner*—James A. Leppink
*Attorney, Agent, or Firm*—Eugene N. Ridle

[57] ABSTRACT

A packing for a wellhead assembly to seal between a casing and a bore within the wellhead as the casing moves longitudinally in the wellhead in response to thermal conditions. The packing is mounted on the exterior free upper end portion of the casing inside the wellhead bore.

21 Claims, 5 Drawing Figures

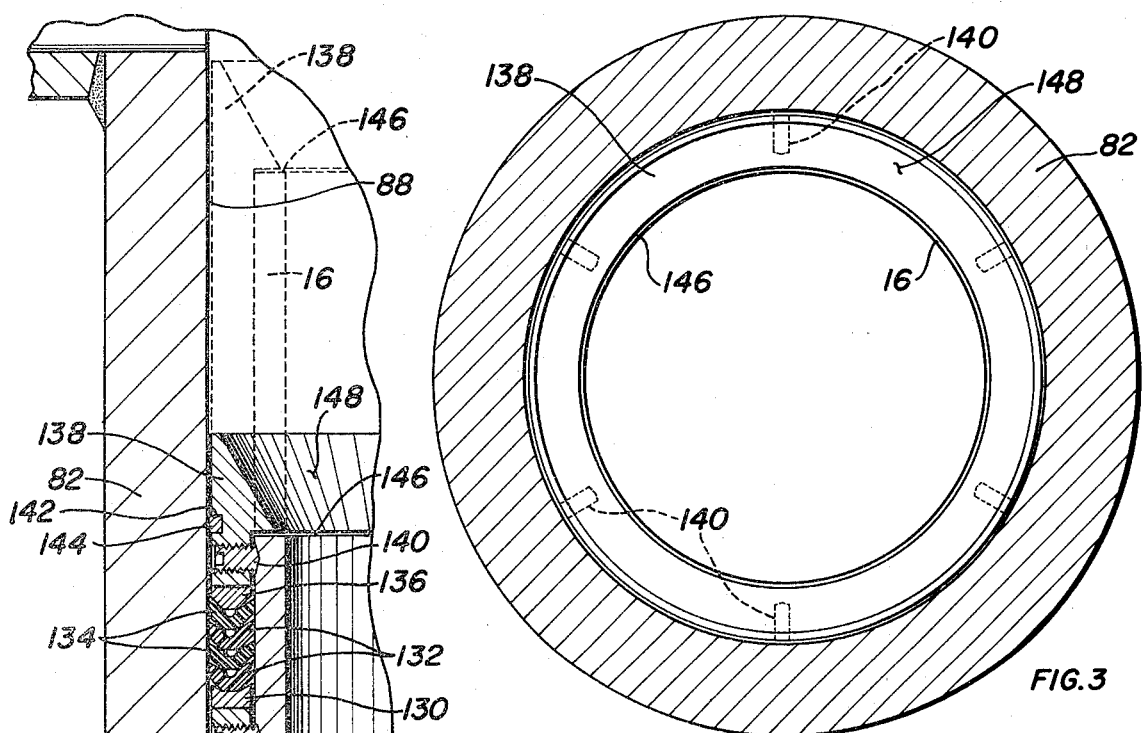

PACKING MEANS FOR A WELLHEAD ASSEMBLY

BACKGROUND OF THE INVENTION

This invention is related to packings for geothermal wellheads. More particularly the invention is related to packing assemblies which are mounted on the casing and positioned inside the bore of a geothermal wellhead to seal the casing as it moves up and down in response to thermal conditions at the wellhead. In the construction of geothermal wells a casing is cemented in place in the hole extending from above the ground surface to the steam production zone, and a surface casing is cemented through the water bearing formation to the surface where the geothermal type wellhead is mounted. The casing is cemented in place to within a few feet of the ground surface so that is is substantially rigidly placed in the well. During periods when steam is passed through the casing it is heated and expands so the upper end of the casing above the cement level moves upward as its temperature raises. The distance which the casing moves upward depends upon the size of the casing and the distance from the top of the cement to the upper end of the casing. In conventional oil and gas wells the casing is secured in the wellhead by slips which support part or all of the weight of the casing. However, these devices will not function properly for geothermal wells because of expansion and contraction of the casing in the upper portion of the well. Heretofore geothermal wellhead structures are adaptations of conventional oil and gas wellheads wherein packing for the casing is mounted with the wellhead structure and seals on the exterior of the casing as it moves up and down. A basic fault in these prior art devices is the seal structures which they have are not constructed to provide effective sealing in the high temperature conditions and considering motion of the casing. Basically, the prior art devices have a seal mounted in the wellhead which rubs on the casing. This seal is urged against the casing by a plurality of screws which must be manually tightened and adjusted to seal the casing. In use of these devices motion of the casing loosens the seal thus necessitating readjusting the screws manually to tighten the seal. Another fault of the prior art devices is they do not have any provision for lubrication of the joint between the casing and the seal. One additional shortcoming of prior art devices is that they do not have anything to function as a corrosion inhibitor for metals inside the wellhead. Both corrosion and lubrication are factors which greatly affect seal life and performance in a geothermal wellhead because of the temperatures and elements involved.

SUMMARY OF THE INVENTION

In a specific embodiment an improved packing structure is provided for a geothermal wellhead assembly which has the packing structure secured to the upper end portion of the casing and positioned inside a smooth bore in the wellhead. The wellhead is constructed with a centralizer to centrally position the casing in the wellhead bore so it will move in the centralized position up and down as it expands and contracts due to the changing temperature environment in which it operates. The specific packing structure consists of plurality of sealing rings mounted on the exterior of the casing at its upper end portion to move with the casing and provide a seal between the exterior of the casing and the interior of the wellhead bore. A scraper is provided above the packing to scrape the bore for removing foreign material. The packing structure is shown in two specific embodiments, one of which has a pair of separately mounted packing structures and the other of which has a pair of packing structures which are cooperatively mounted on the casing.

One object of this invention is to provide a packing structure for a geothermal wellhead structure which overcomes the aforementioned disadvantages of the prior art devices and will effectively seal the casing in the wellhead bore for normal operating temperatures and operating conditions.

Still, another object of this invention is to provide a packing structure for a geothermal wellhead which has a packing assembly rigidly secured to the exterior of the casing and positioned inside the bore of a wellhead.

Still, another object of this invention is to provide a packing structure for a geothermal wellhead which has a packing assembly mounted on the upper end of portion of the well casing inside the bore of the wellhead and which has a scraper also mounted on the casing and positioned above the packing assembly to clean or scrape the wellhead bore for removing foreign material.

Various other objects, advantages, and features of this invention will become apparent to those skilled in the art from the following discussion, taken in conjunction with the accompanying drawings, in which:

DESCRIPTION OF THE DRAWINGS

FIG. 3 is a cross section or view of the wellhead structure shown in FIG. 2 with the view taken on line 3—3 of FIG. 2.

FIG. 4 is an enlarged cross sectional fragmentary view of the centralizer and packing assembly in mounted relation with the geothermal wellhead. Dashed lines show the casing, scraper, and packing assembly in an upwardly displaced position; and FIG. 5 is an enlarged cross sectional fragmentary view of a second embodiment of the packing assembly employing cooperative mounting of the packing rings and shown in mounted relation with the wellhead.

The following is a discussion and description of preferred specific embodiments of the improved packing structure of this invention, such being made with reference to the drawings, whereupon the same referenced numerals are used to indicate the same or similar parts and/or structure. It is to be understood that such discussion and description is not to unduly limit the scope of the invention.

DETAILED DESCRIPTION

Figure 1:
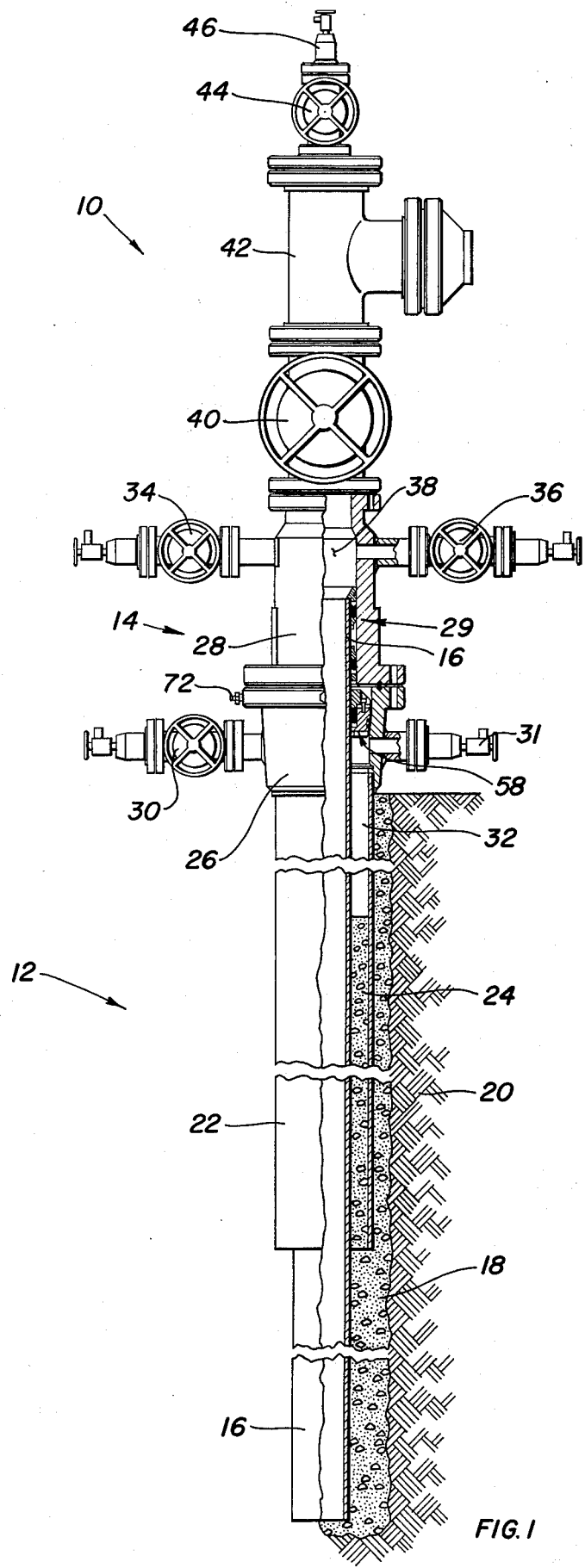
FIG. 1 is a sectional and partially cut away view of a geothermal wellhead and christmas tree showing the casing and the surface casing in its cemented relation in the well hole.

FIG. 1 on sheet 1 of the drawings shows a christmas tree 10 and an associated geothermal well 12 with the improved assembly of this invention in the wellhead structure 14. The geothermal well 12 includes a casing 16 mounted in a hole 18 in the ground 20. Surface casing 22 is positioned around the upper end of the casing 16 through the water bearing formation. Casing 16 and surface casing 22 are secured in hole 18 by cement 24. Casing 16 is an inner casing relative to surface casing 22 and for simplicity in description for the specific well and wellhead construction shown it is referred to as a casing. Wellhead 14 includes a casing head 26 secured to the upper end of surface casing 22, and an expansion spool 28 mounted atop the casing head. Annulus valves 30 and 31 are provided on casing head 26 for fluid communication with the annulus cavity 32 between casing 16 and surface casing 22 above the cement level between the casings. On the expansion spool 28 wing valves 34 and 36 are provided for fluid communication with the cavity 38 inside expansion spool 28. Above expansion spool 28 is the master valve 40, a flow fitting 42, a valve 44 and a top connection 46. The christmas tree shown represents a typical installation, however it can be changed at the desire of the user. Casing 16 can be opened on the bottom or perforated as desired to allow steam to enter the casing.

Figure 2:
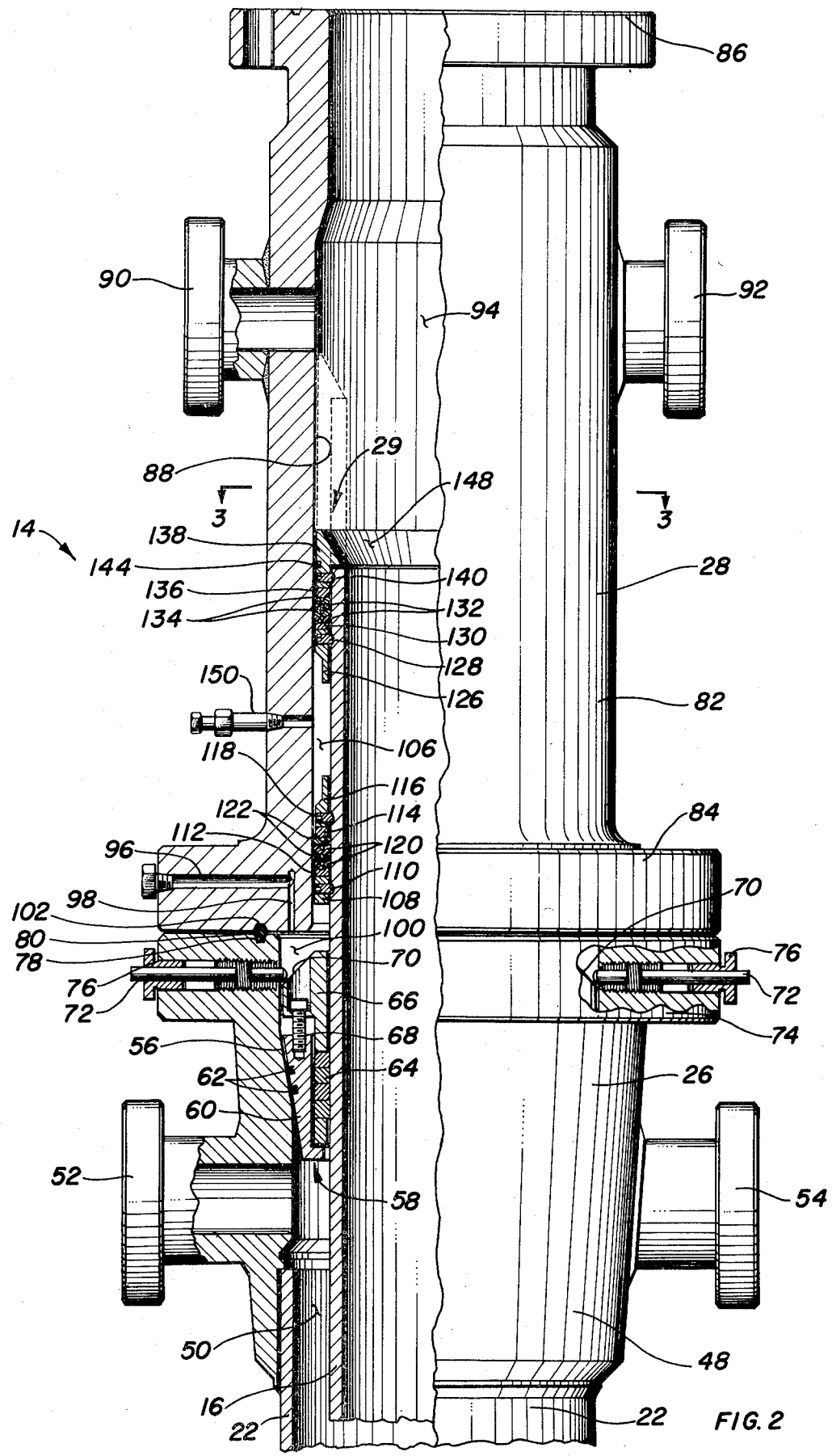
FIG. 2 is an enlarged partially cut away elevation view of a geothermal wellhead having the novel packing apparatus of this invention.

FIG. 2 shows in detail wellhead 14 with portions of it being cut away for clarity. When installed surface casing 22 is secured by welding to the lower portion of casing head 26 and an annulus cavity 50 is formed between casing 16 and surface casing 22. Annulus cavity 50 is provided with flanged outlets 52 and 54 for mounting valves 30 and 31. Casing head 26 has an inclined bore surface 56 which supports a centralizer assembly indicated generally at 58. Centralizer assembly 58 centers casing 16 relative to casing head 26 and expansion spool 28. Centralizer assembly 58 has a lower member 60 with a tapered exterior portion having grooves to receive seal rings 62. Seal rings 62 are preferably high temperature type packing rings of a suitable composition to withstand the high temperature environment.

Lower member 60 has a packing 64 mounted in a pocket in the interior portion. Packing 64 contacts the exterior of casing 16 for sealing. Centralizer assembly 58 additionally includes an upper member 66 which is attached by bolts 68 to the centralizer lower member 60. Centralizer upper member 66 has an inclined upper surface 70 on its exterior peripheral portion as shown which is contacted by hold down screws 72 when the centralizer is mounted as shown. Hold down screws 72 are threadedly engaged radially through an outwardly extending flange 74 on the upper end of casing head 26. Hold down screws 72 are provided with a packing and a packing tightening nut 76 for sealing. The uppermost surface of casing head 26 has a groove 78 therearound the aperture end to receive a seal ring 80 for sealing the casing head with the expansion spool.

Centralizer assembly 58 is constructed so that in operation it will center casing 16 in the internal bore of wellhead 14 as the casing moves up and down due to the expansion and contraction. Packing 64 is provided on the centralizer assembly so it will function as a sealing structure between annulus cavity 50 and the upper portions of the wellhead. To effect the seal of centralizer assembly 58 it is positioned around casing 16 with the upper and lower members 66 and 60 of the centralizer assembly being connected by bolts 68. Once centralizer assembly 58 is positioned in casing head 26 then oppositely positioned hold down screws 72 are tightened to centrally position the upper centralizer assembly member 66 and to urge it downward. Upper centralizer member 66 moves downward as the inner ends of the hold down screws 72 move on the incline surface 70. Packing 64 is compressed between the centralizer members and forced against the exterior of casing 16 as upper centralizer member 66 is moved downward.

Expansion spool 28 is a hollow member having an elongated center portion 82 with flanges 84 and 86 on its lower and upper ends respectively for mounting with the christmas tree and the casing head. Expansion spool center portion 82 contains the cylindrical wellhead bore. Wellhead bore is cross-sectionally round and extends in a uniform size through the center portion 82 of the expansion spool 28 and through lower flange 84. The surface defining the bore is indicated at 88. A pair of oppositely disposed flanged outlets 90 and 92 are mounted through the side wall of expansion spool 28 below upper flange 86 to provide fluid communication with the expansion spool cavity 94 inside the bore. On the lower portion of expansion spool 28 a normally plugged auxillary port 96. This port 96 is provided which is communicably connected by conduit 98 to the lower end of lower flange 84. A cavity 100 is formed above centralizer assembly 58 and below the lower end of flange 84 and it is communicably connected with conduit 98. Auxillary port 96 provides a test point to test for fluid leakage in cavity 100. Flange 84 has a groove 102 in its lower end to receive an oval ring gasket 80 and hold it in cooperation with groove 78 in casing head flange 74. Oval ring gasket 80 provides a means to seal the fluid connection between casing head 26 and expansion spool 28.

Packing assembly 29 is shown in detail in the left hand center side portion of FIG. 2 and in FIG. 4. Packing assembly 29 includes a pair of individual packing sub-assemblies which are secured to casing 16 in a spaced relation one above the other. The upper packing sub-assembly of packing assembly 29 is positioned at the uppermost end portion of casing 16 and it includes as a part of its mounting structure the mount for the scraper. The lower packing sub-assembly is separated from the upper packing sub-assembly by an annularly shaped space 106. Lower packing sub-assembly has a lower packing support ring 108 rigidly secured to the exterior of casing 16 by headless fasteners 110. A lower packing ring adapter 112 is positioned above lower packing support ring 108. A plurality of rings of packing are positioned above lower packing ring adapter 112. An upper packing ring adapter 114 is positioned above the rings of packing, and another packing ring 116 above upper packing ring adapter 114 and rigidly secured to casing 16 by headless fasteners 118. A plurality of headless fasteners are used in a spaced relation around the support ring. The rings of packing are generally cross-sectionally V-shaped rings and they are preferably provided in the form of two pairs that are constructed of alternating materials. One pair of packing rings 120 is constructed of a material having suitable high temperature sealing characteristics while the other pair of packing rings 122 are constructed of a material having a suitable lower temperature characteristics. It is important to note that the packing rings are positioned in alternating relation. Both the high temperature rings 120 and the low temperature rings 122 are preferably constructed with the cross-sectional form as shown. The bottom or apex portion of each ring is essentially flat and rests on top of the ring or member below. The upper portion of each ring has a generally U-shaped and a downwardly extending groove 124. This particular construction is preferred because it allows for lateral expanding motion of the packing rings due to fluid pressure once they are installed.

The upper packing sub-assembly of packing assembly 29 has a packing support ring 126 secured to casing 16 by headless fasteners 128. A lower packing ring adapter 130 is positioned above packing suport ring 126 and the plurality of alternating rings of packing 132 and 134 are positioned on top of the lower packing ring adapter 130. An upper packing ring adapter 136 is positioned on top of the uppermost ring of packing. An upper packing support ring 138 is rigidly secured to casing 16 by headless fasteners 140 and positioned on top of upper packing ring adapter 136. A plurality of headless fasteners are mounted around the support rings in a spaced relation. The alternating pairs of packing rings 132 and 134 are constructed in the same physical form as the previously described packing rings 120 and 122 and they are constructed of the same materials. Upper packing support ring 138 has a groove 142 around the perimeter of its exterior to receive and mount a scraper ring 144. Preferably groove 142 and scraper ring 144 are constructed with a rectangular cross section so a flat surface of ring 144 is positioned against wellhead bore surface 88. Scraper ring 144 is constructed of a rigid and suitably hard material so that it will scrape scale, rust, and foreign matter from bore surface 88 as casing 16 moves up and down inside the wellhead. Upper packing support ring 138 can be mounted so it extends above the upper end 146 of casing 16. The outer portion of upper packing support ring 138 is round and cylindrical to match bore surface 88 and the inner portion has an inclined surface 148 tapering between bore surface 88 and the interior of casing 16. The tapered or inclined surface 148 on upper packing support ring 138 provides a smooth flow transition for the fluid passing through casing 16 as it enters cavity 38 inside the wellhead above the upper end of the casing. It is to be noted that upper packing subassembly can be mounted below the upper end of casing 16 (with upper packing support ring 138 constructed without the tapered surface) and it will function to scrape bore 88 and seal the casing in the wellhead.

In the midportion of expansion spool 28 an auxillary inlet is provided for injecting a sealing compound into cavity 106 between the separate packing assemblies for emergency sealing purposes. The auxiliary inlet is provided with a normally closed fluid fitting 150 which can be opened for connection with a suitable fluid injecting device for use. This is an important feature of this invention because it provides an inlet or opening into cavity 106 which can be used for several purposes. One use of this inlet is to inject an emergency sealing compound into cavity 106 to seal between casing 16 and bore surface 88 in the event of failure or excess leakage of the packing assembly. This inlet can be used as a point test for determining pressure in cavity 106 as well as being usable as an inspection port. An important use of this inlet or opening is to inject a lubricant and corrosive inhibiting material into cavity 106 to protect the packing assembly and the casing bore surface 88. By lubricating the packing assembly and protecting bore surface 88 from corrosion the life of the packing assembly can be much longer than it would be otherwise.

Another structural embodiment of the packing assembly of this invention is shown in detail in FIG. 5 and indicated generally at 160. All portions of the wellhead with the exceptions of certain portions of the packing and its support structure are the same as that previously described and for that reason bear the same numerals as the parts described previously. Packing assembly 160 includes the lower packing support ring 108 secured to the casing 16 by a headless fastener 110. A lower packing adapter ring 112 is positioned on top of lower packing support ring 108. The lower packing consists of the alternating pairs 120 and 122 of low temperature and high temperature sealing materials. The same as that described supra. The upper packing also includes alternating pairs of high temperature and low temperature packings 132 and 134. An upper packing adapter 136 is mounted above uppermost packing ring 134. An upper packing support ring 138 is secured to casing 16 by headless fastener 140. Upper packing support ring 138 has an outer peripheral groove that mounts a scraper ring 144. Between the upper packing and the lower packing is a perforated spacing sleeve 162 which has its lower end portion 164 and its upper end portion 166 specially shaped to support the packing rings. The central portion of perforated spacing sleeve 162 has a plurality of aperatures 168 therethrough. Aperatures 168 allow fluid communication between opposite sides of perforated spacing sleeve 162 to equalize fluid pressure on the opposed side edges of the packing rings. The spacing sleeve lower edge portion 164 has champhered edge portions 170 so it will fit into the upper portion of the top V-shaped packing ring 122 on the lower packing. Upper edge portion 166 of perforated spacing sleeve 162 has upwardly extending ridges 172 on its opposite sides to form the upper surface in a generally lower V-shaped packing ring 132. Perforated spacing sleeve 162 is positioned near the central portion of the annular space 170 between wellhead bore surface 88 and the exterior of casing 16. In the event of the necessity to inject an emergency sealing compound into annular space 170, it can be done through the fluid connection 150. A sealing compound can completely fill annular space 170 by passing through apertures 168 in perforated spacing sleeve 162.

In the use and operation of a geothermal wellhead having the packing assembly of this invention such provides a structure for fluid sealing between the casing and the wellhead bore as the casing moves up and down due to charges in its temperature environment. Because the packing assembly is mounted on the exterior of casing 16 and enclosed within smooth bore surface 88 in expansion spool 28 it provides for continuous sealing as the casing moves up and down inside the wellhead in all normal operation. The particular construction of two alternating pairs of sealing rings and each of the two separate packings of the packing assembly is a novel feature of this invention because it provides for high temperature sealing by using a material which is particularly well suited for high temperature sealing and it provides low temperature sealing by using a material that is particularly suited for low temperature sealing operations. The high temperature packing rings can be constructed from a fluroplastic type of material to obtain good sealing at high temperature. For example, materials such as polytetrafluorethylene (TFE);, perfluoroalkoxy (PFA), fluorinated ethylene propylene (FEP), polyvinylidene fluoride (Kynar), polychloro trifluoroethylene (CTFE), or tefzel (ETFE) can be used for the high temperature packing rings. The low temperature packing rings can be constructed from an elastomeric material which has a resistance to high temperature, water and steam. For example, materials of the type generally referred to as ethylene propoline can be used for the low temperature packing rings.

As the casing moves up and down inside the smooth bore 88 of expansion spool 28, the scraper ring in 144 scrapes the bore surface 88 to remove foreign material. As the casing 16 moves upward scraping ring 144 removes scale, rust, and other foreign material from bore surface 88 before the packing rings contact that particular portion of bore surface 88. This scraping of bore surface 88 will prolong the usual life of the upper packing rings because the bore is cleaned prior to their moving over it. The particular shape of upper packing support ring 138 in the portion thereof which extends thereabove the upper end of casing 16 is important in that it provides a smooth slow transition between casing 16 and the bore because the bore is substantially larger in cross-sectional area than the interior of casing 16. Steam flowing from casing 16 will expand upon entering the bore above casing 16. This expansion can, depending upon the pressure and temperature conditions at that point, cause condensation which cause corrosion pitting and this is undesirable. The inclined surface 148 on upper packing support ring 138 provides a smooth transition to aid in reducing the effect of expansion on the steam as it passes from conduit 16.

It is to be understood the packing rings, the packing ring adapter ring constructions and packing ring support structures can be varied from the specific structural embodiments shown without departing from the scope of this invention. For example, the packing ring adapters can be eliminated by including their packing ring support features into the packing support rings. Also, additional pairs of packing rings can be added if desired and the specific structure of the individual packing rings can be changed from that shown in the drawings. If desired the headless fasteners securing the packing support rings to the casing can be provided in pairs for locking or construction of a self-locking type.

In the installation of the geothermal wellhead at a steam well, the typical distance between a few feet to several hundred feet depending upon the specific installation. With this variance in distance obviously the length of the casing between the cement and expansion spool varies therefore the temperature induced length change of casing 16 will vary. The wellhead packing assembly of this invention can be used in situations where linear casing expansion is negligible or where it is several feet. For a particular installation the length of the expansion spool can be chosen so it will accommodate the linear casing expansion for the specific installation. The expansion spool is chosen by considering the size and length of pipe for expected temperature conditions. The actual length of expansion for a specific installation is subject to several variables including temperature, pressure, free length of the pipe, material composition of the pipe, etc. As an example for conventional casing of approximately 9 inches (22.76 cm) outside diameter cemented in a geothermal well to within about 20 feet (6.09 m) of the grooved surface it can be expected the casing length will be increased about 1 inch (2.54 cm) to 3 inches (7.62 cm) or thereabout for a temperature increase of about 200° to about 700°F. The packing assembly of this invention is constructed so it can be used over a wide range of temperatures and pressures and function to provide continuous effective sealing between the casing and the expansion spool in a geothermal wellhead.

As will become apparent from the foregoing description of the improved packing structure a relatively simple yet extremely effective packing structure has been provided to seal the fluid connection between the casing and the expansion spool and the geothermal wellhead structure. The improved packing structure is relatively simple in construction, effective in function, and provides a seal which allows for lengthening and shortening of the casing in response to temperature conditions in a geothermal wellhead.

What is claimed is:

1. In a geothermal wellhead assembly having a casing head and an inner casing therein rigidly secured to the earth from substantially its lower end portion up to a relatively shallow depth at a point beneath said casing head and having an upper unrestrained end portion extending above said casing head, said inner casing being unsupported by said casing head and wholly supported adjacent its lower end portion, said wellhead assembly having a bore therein above the casing head receiving the inner casing and defining an annular space between the outer surface of the inner casing and the inner surface defining said bore, guide means within said bore contacting the outer surface of said inner casing to guide said inner casing upon longitudinal movement relative to said casing head upon longitudinal expansion and contraction of said inner casing upper unrestrained end portion relative to said casing head and the earth resulting from its thermal environment,
   a packing assembly mounted within said annular space and secured to the exterior of said inner casing upper end portion and extending in sealing relation between said inner casing and said inner surface defining said bore,, said packing assembly being moveable with said inner casing upper end portion inside said bore as said inner casing moves up and down in said relative longitudinal movement in response to temperature changes of said inner casing.

2. The apparatus of claim 1, wherein said packing assembly has a pair of separate packing structures mounted in a spaced relation one above the other on said inner casing upper end portion.

3. The apparatus of claim 2, wherein:
   a. each of said packing structures has a pair of annular packing retainer members rigidly secured to said exterior of said inner casing upper end portion,
   b. each of said packing structures has a plurality of annular packing members secured in an adjacent relation between said annular packing retainer members, and
   c. said annular packing members being alternately positioned members having suitable high temperature sealing characteristics and suitable lower temperature sealing characteristics respectively.

4. The apparatus of claim 2, wherein:
   a. said packing assembly has a pair of adjacent annular packing members secured to said inner casing by a packing mount means, one of said annular packing members being constructed of a material having suitable high temperature sealing characteristics and the other of said packing members being constructed of a material having suitable lower temperature sealing characteristics.

5. The apparatus of claim 4, wherein:

a. said means to guide has a centralizer rigidly mounted in said casing head and longitudinally slidably engaged with said inner casing, said centralizer having a means to seal same between said inner casing and said wellhead.

6. The apparatus of claim 1, wherein said packing assembly has a pair of annular packing retainer members rigidly mounted in a spaced relation on said exterior of said inner casing upper end portion, an annular packing member adjacent to each of said packing retainer members, and an annular spacing member mounted between said packing members.

7. The apparatus of claim 6, wherein said packing members each comprised of a plurality of packing members arranged in a stacked relation and having alternately positioned members having suitable high temperature sealing characteristics and members having suitable lower temperature sealing characteristics respectively.

8. In a wellhead assembly having a casing head and an inner casing therein rigidly secured adjacent its lower end portion beneath said casing head and having an upper unrestrained free end portion extending above said casing head, said wellhead assembly having a bore therein above the casing head receiving the inner casing defining an annular space between the outer surface of the inner casing and the inner surface defining said bore, guide means within said bore contacting the outer surface of said inner casing to guide said inner casing upon longitudinal movement relative to said casing head upon longitudinal expansion and contraction of said inner casing relative to said casing head resulting from its thermal environment,
 a. a packing assembly mounted within said annular space including a pair of separate packing structures mounted in a spaced relation one above the other secured to said inner casing upper end portion and extending in sealing relation between said inner casing and said inner surface defining the bore, said packing assembly being moveable with said free upper end portion inside said bore as said inner casing moves in said relative longitudinal movement in response to temperature changes of said inner casing,
 b. said packing assembly having a pair of adjacent annular packing members secured to said inner casing by a packing mount means, one of said annular packing members being constructed of a material having suitable high temperature sealing characteristics and the other of said packing members being constructed of a material having suitable lower temperature sealing characteristics,
 c. said guide means having a centralizer rigidly mounted in said casing head and longitudinally slidably engaged with said inner casing, said centralizer having a means to seal same between said inner casing and said casing head and,
 d. said inner casing having means to scrape said bore rigidly mounted on the upper end portion thereof above the uppermost packing assembly, said means to scrape having an annular scraper member in sliding contact with the surface of said bore to scrape the surface of said bore upon said longitudinal sliding motion of said inner casing in said casing head.

9. The apparatus of claim 8, wherein:
 a. said means to scrape has an annular scraper mount member rigidly secured to the extreme upper end portion of said inner casing, said scraper mount member has a groove in its exterior portion, and
 b. said scraper member is an essentially rigid ring mounted in said scraper mount groove.

10. The apparatus of claim 9, wherein:
 a. said scraper mount member has an elongated upper end portion extending beyond the upper end of said inner casing and an inwardly extending portion overlying said upper end of said inner casing, and
 b. said upper end portion of said inwardly extending portion being joined by an inclined portion extending inwardly and downwardly over said inner casing upper end providing a smooth transition between the interior of said inner casing and said bore.

11. The apparatus of claim 9, wherein:
 a. said annular packing member being of a plastic material and having high temperatures sealing characteristics,
 b. said annular packing member being a synthetic elastomeric material and having low temperature characteristics, and
 c. said packing assembly having two pairs of said packing members with said packing members arranged in an alternating relation.

12. In a wellhead assembly having a casing head and an inner casing therein rigidly secured adjacent its lower end portion beneath said casing head and having an upper unrestrained free end portion extending above said casing head, said wellhead assembly having a bore therein above the casing head receiving the inner casing and defining an annular space between the outer surface of the inner casing and the inner surface defining said bore, guide means within said bore contacting the outer surface of said inner casing to guide said inner casing in longitudinal movement relative to said casing head upon longitudinal expansion and contraction of said inner casing relative to said casing head resulting from its thermal environment,
 a. a packing assembly mounted within said annular space and secured to the exterior of said upper end portion of said inner casing for extending in sealing relation between said inner casing and said inner surface defining the bore, said packing assembly being moveable with said free upper end portion inside said bore as said inner casing moves in said relative longitudinal movement in response to temperature changes of said inner casing, and
 b. a means to scrape the inner surface of said wellhead assembly defining said bore rigidly secured on the upper end portion of said inner casing above said packing assembly, said means to scrape including an annular scraping member in contact with said surface defining said bore to scrape said surface upon longitudinal motion of said inner casing in said casing head.

13. The apparatus of claim 12, wherein said packing assembly has a pair of separate packing structures mounted in a spaced relation on said inner casing upper end portion.

14. The apparatus of claim 12, wherein said packing assembly has a pair of adjacent annular packing members secured to said casing by a packing mount means, one of said annular packing members being constructed of a material having suitable high temperature sealing characteristics and the other of said packing members being constructed of a material having suitable lower temperature sealing characteristics.

15. The apparatus of claim 14, wherein said means to guide has a centralizer rigidly mounted in said casing head and longitudinally slidably engaged with said inner casing, said centralizer having a means to seal same between said inner casing and said casing head.

16. The apparatus of claim 15, wherein:
   a. said means to scrape has an annular scraper mount member rigidly secured to the extreme upper end portion of said inner casing, said scraper mount member has a groove in its exterior portion, and
   b. said scraper member is an essentially rigid ring mounted in said scraper mount groove.

17. The apparatus of claim 16, wherein:
   a. said scraper mount member has an elongated upper end portion extending beyond the upper end of said inner casing and an inwardly extending portion overlying said upper end of said inner casing, and
   b. said upper end portion of said inwardly extending portion being joined by an inclined portion extending inwardly and downwardly over said inner casing upper end providing a smooth transition between the interior of said inner casing and said surface defining said bore.

18. In a wellhead assembly having a casing head and an inner casing therein rigidly secured adjacent its lower end portion beneath said casing head and having an upper restrained free end portion extending above said casing head, said wellhead assembly having a bore therein above the casing head receiving the inner casing and defining an annular space between the outer surface of the inner casing and the inner surface defining said bore, guide means within said bore contacting the outer surface of said inner casing to guide said inner casing upon longitudinal movement relative to said casing head upon longitudinal expansion and contraction of said inner casing relative to said casing head resulting from its thermal environment,
   a. a packing assembly mounted within said annular space and secured to the exterior of said upper end portion of said inner casing for extending in sealing relation between said inner casing and said inner surface defining the bore, said packing assembly being moveable with said free upper end portion inside said bore as said inner casing moves in said relative longitudinal movement in response to temperature changes of said inner casing, and
   b. an auxilliary packing means having a normally closed opening through said wellhead assembly communicably connecting an external point and said annular space, said opening being operable for injecting a sealing compound into said annular space to seal said inner casing and said inner surface defining said bore.

19. The apparatus of claim 18, wherein said packing assembly has a pair of separate packing structures mounted in a spaced relation one above the other on said inner casing upper end portion, and said auxillary packing means opening is positioned in said wellhead assembly at a point between said separate packing structures.

20. In a wellhead assembly having a casing head and an inner casing therein rigidly secured adjacent its lower end portion beneath said casing head and having an upper unrestrained free end portion extending above said casing head, said wellhead assembly having a bore therein above the casing receiving the inner casing and defining an annular space between the outer surface of the inner casing and the inner surface defining said bore, guide means within said bore contacting the outer surface of said inner casing to guide said inner casing in longitudinal movement relative to said casing head upon longitudinal expansion and contraction of said inner casing relative to said casing head resulting from its thermal environment,
   a. a packing assembly mounted within said annular space and secured to the exterior of said upper end portion of said inner casing for extending in sealing relation between said inner casing and said inner surface defining the bore, said packing assembly being moveable with said free upper end portion inside said bore as said inner casing moves in said relative longitudinal movement in response to temperature changes of said inner casing,
   b. a means to scrape the inner surface of said wellhead assembly defining said bore rigidly secured on the upper end portion of said inner casing above said packing assembly, said means to scrape including an annular scraping member in contact with said surface defining said bore to scrape said surface upon longitudinal motion of said inner casing in said casing head, and
   c. an auxilliary opening through said wellhead assembly communicably connecting a point on the exterior of said wellhead assembly and said annular space, said auxillary opening being normally closed and in use being openable for providing access to said annular space for such purposes as inspection, and placing a sealing compound, lubricating compound, corrosion inhibiting compound in said annular space.

21. The apparatus of claim 20, wherein said packing assembly has a pair of separate packing structures mounted in a spaced relation on said inner casing upper end portion, and said auxillary packing means opening is positioned in said wellhead assembly at a point between said separate packing structures.

* * * * *